(12) United States Patent
Angst et al.

(10) Patent No.: US 10,151,228 B2
(45) Date of Patent: Dec. 11, 2018

(54) AMMONIA SLIP DETECTION

(71) Applicant: Ford Global Technologies, LLC, Dearborn, MI (US)

(72) Inventors: Monika Angst, Aachen (DE); Leonhard Bartsch, Aachen (DE); Frederik De Smet, Genk (BE); Daniel Roettger, Eynatten (BE); Christian Winge Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 15/344,424

(22) Filed: Nov. 4, 2016

(65) Prior Publication Data

US 2017/0122168 A1    May 4, 2017

(30) Foreign Application Priority Data

Nov. 4, 2015   (DE) ................ 10 2015 221 648

(51) Int. Cl.
| | |
|---|---|
| *F01N 3/20* | (2006.01) |
| *F02M 26/06* | (2016.01) |
| *F01N 3/08* | (2006.01) |
| *F01N 3/28* | (2006.01) |
| *F01N 9/00* | (2006.01) |
| *F01N 11/00* | (2006.01) |

(52) U.S. Cl.
CPC ........... *F01N 3/208* (2013.01); *F01N 3/0814* (2013.01); *F01N 3/0842* (2013.01); *F01N 3/2882* (2013.01); *F01N 9/005* (2013.01); *F01N 11/00* (2013.01); *F01N 11/007* (2013.01); *F02M 26/06* (2016.02); *F01N 2550/02* (2013.01); *F01N 2560/026* (2013.01); *F01N 2610/02* (2013.01); *F01N 2900/0416* (2013.01); *F01N 2900/08* (2013.01); *F01N 2900/1616* (2013.01); *Y02T 10/24* (2013.01); *Y02T 10/47* (2013.01)

(58) Field of Classification Search
CPC .. F01N 3/208; F01N 3/2066; F01N 2560/026; F01N 2610/02; F01N 2900/1616; F02M 26/06

See application file for complete search history.

(56) References Cited

U.S. PATENT DOCUMENTS

| | | |
|---|---|---|
| 8,347,609 B2 | 1/2013 | Hepburn et al. |
| 8,800,274 B2 | 8/2014 | Sun et al. |
| 2005/0282285 A1 | 12/2005 | Radhamohan et al. |
| 2010/0024393 A1 | 2/2010 | Chi et al. |
| 2011/0005202 A1 | 1/2011 | Gady et al. |
| 2011/0099977 A1* | 5/2011 | Takahashi ............... F01N 3/208 60/274 |
| 2011/0185707 A1 | 8/2011 | Upadhyay et al. |
| 2012/0159934 A1 | 6/2012 | Itoh |

(Continued)

FOREIGN PATENT DOCUMENTS

WO    2014070244 A1    5/2014

*Primary Examiner* — Jonathan Matthias
(74) *Attorney, Agent, or Firm* — Julia Voutyras; McCoy Russell LLP

(57) ABSTRACT

Methods and systems are provided for detecting ammonia slip from a catalytic converter. In one example, a method may include recirculating exhaust gas containing ammonia and measuring only a $NO_x$ concentration of the recirculated exhaust gas following its combustion.

20 Claims, 5 Drawing Sheets

(56) References Cited

U.S. PATENT DOCUMENTS

| | | |
|---|---|---|
| 2013/0261930 A1 | 10/2013 | Kurtz et al. |
| 2013/0263593 A1 | 10/2013 | Gonzalez Delgado et al. |
| 2014/0033685 A1 | 2/2014 | Chandler et al. |
| 2014/0102077 A1* | 4/2014 | Riffle .................. F02D 41/0235 60/273 |
| 2014/0165560 A1 | 6/2014 | Henry et al. |
| 2016/0115851 A1* | 4/2016 | Kogo .................... F01N 3/2066 60/276 |

* cited by examiner

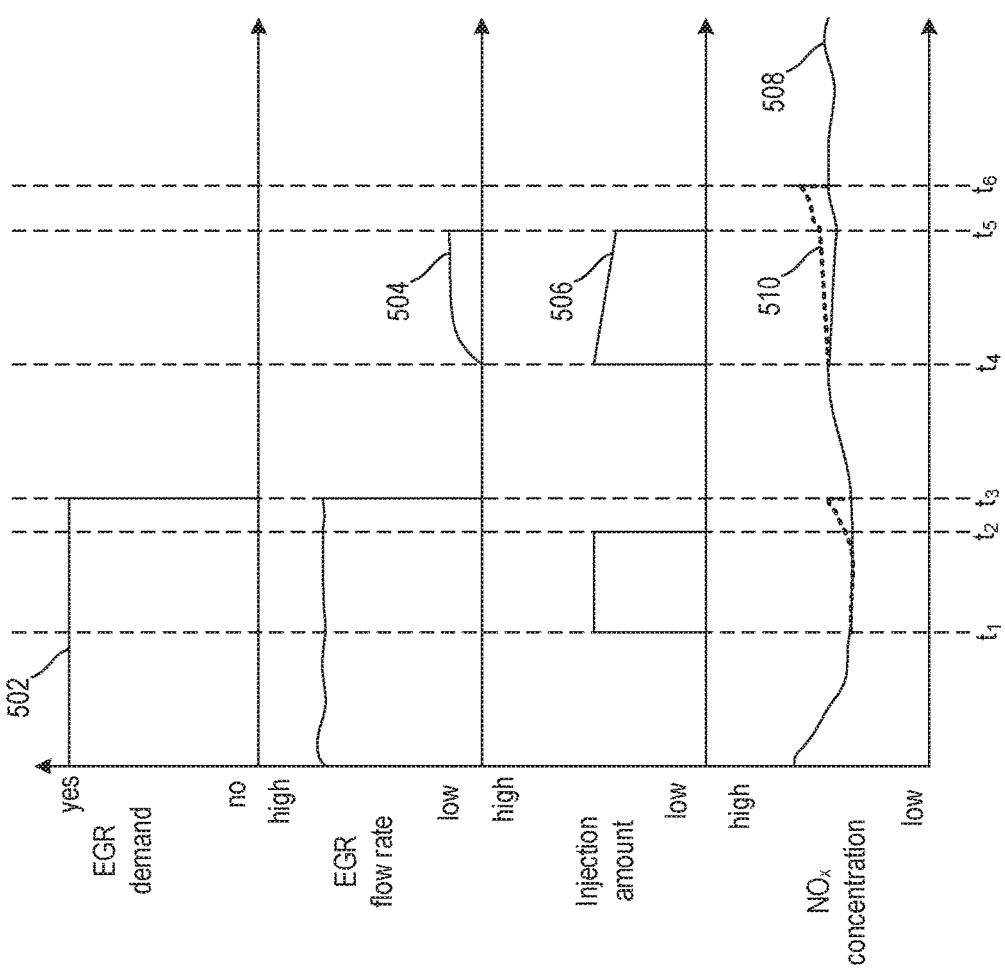

AMMONIA SLIP DETECTION

CROSS REFERENCE TO RELATED APPLICATION

The present application claims priority to German Patent Application No. 102015221648.9, filed on Nov. 4, 2015. The entire contents of the above-referenced application are hereby incorporated by reference in its entirety for all purposes.

FIELD

The present description relates generally to detecting ammonia slip from a catalytic converter in an exhaust tract of an internal combustion engine with an exhaust gas recirculation system.

BACKGROUND/SUMMARY

Exhaust gas from internal combustion engines contains, among other things, nitrogen oxides ($NO_x$). These may not easily be depleted in catalytic after-treatment of the exhaust gas since modern internal combustion engines often operate with lean fuel/air mixtures with excess oxygen in order to increase efficiency. Nitrogen oxides which accumulate may not, however, be oxidized in a lean-burn mode, rather are stored in the interim in a nitrogen oxide storage catalytic converter, also referred to as a NOx storage catalytic converter (lean NOx trap, LNT). If the internal combustion engine is operated with a rich fuel/air mixture, the nitrogen oxides stored in the interim are reduced in a LNT to nitrogen and the nitrogen oxide storage catalytic converter is once again free for the storage of nitrogen oxides. LNT and SCR catalytic converters (SCR: selective catalytic reduction) can also be used separately of one another, or in any desired combination.

In order to reduce nitrogen oxides, a reducing agent can be added to the exhaust gas, wherein ammonia is generally used as the reducing agent which is introduced into the exhaust tract in the form of an aqueous urea solution above the nitrogen oxide reduction catalytic converter. The nitrogen oxide reduction catalytic converter can store ammonia in a certain quantity. If the storage function is exhausted or in transient conditions (e.g., fully loaded), ammonia can escape out of the catalytic converter in the event of over-dosing. This phenomenon is also referred to as ammonia slip. Since ammonia has a pungent odor and can be noticed even in very small concentrations, this would lead to an odor in the vicinity of the vehicle in the event of overdosing. This situation can be helped by installing an oxidation catalytic converter behind the SCR catalytic converter, which oxidation catalytic converter converts the ammonia into nitrogen and water in the event of ammonia overdosing. A further possibility for preventing what is known as ammonia slip is a larger configuration of the catalytic converter in order to thus obtain a certain storage function. However, these additional structural measures require additional space and are costly.

Therefore, a method to detect and counteract ammonia slip before large quantities can be released into the environment is desired and described herein.

In one example, the issues described above may be addressed by a method for measuring an exhaust $NO_x$ concentration, during an injection of a reductant from an injector, via a sensor located between an exhaust side of an engine and the injector, comparing the measured $NO_x$ concentration to a baseline value, and determining if ammonia is slipping through a catalyst in response to the measured $NO_x$ concentration being greater than the baseline value by a threshold amount. In this way, reductant is conserved without the introduction of a second catalyst.

As one example, exhaust gas downstream of the catalyst is routed back to an engine independent of an EGR demand. In some examples, EGR flow during the injection may be limited to maintain a combustion stability of the engine. As such, if ammonia slips through the catalyst, the EGR may direct the slipped ammonia back to the engine, where it is oxidized during the combustion process, forming $NO_x$. By doing this, a measured exhaust $NO_x$ concentration may surpass a baseline $NO_x$ concentration, thereby indicating an ammonia slip through the catalyst. In response to the slip, the injector may be deactivated, thereby preventing any further ammonia slippage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows an operating sequence illustrating exhaust gas and injection conditions.

DETAILED DESCRIPTION

Figure 1:
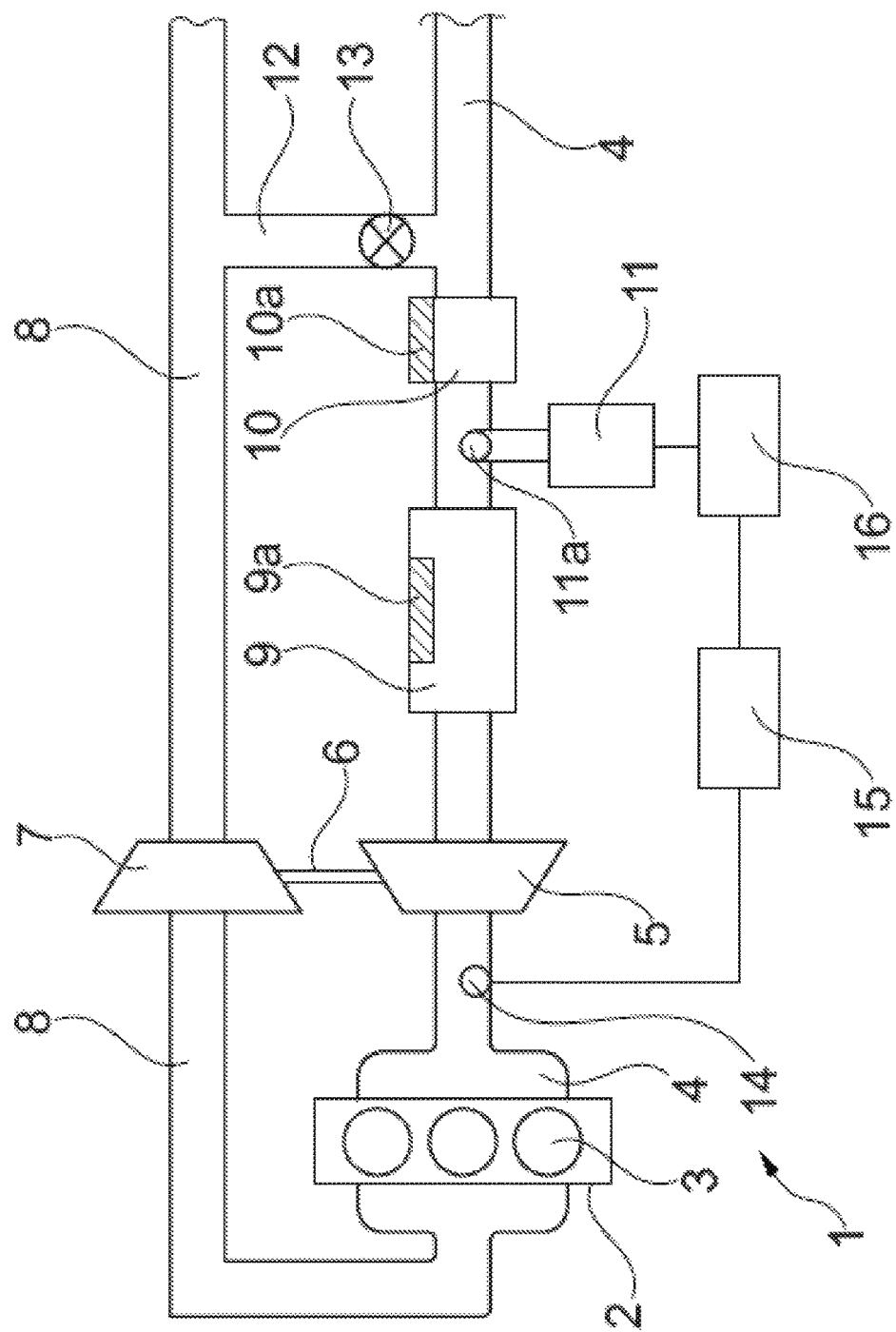
FIG. 1 shows a schematic structure of an engine having a catalyst.
Figure 2:
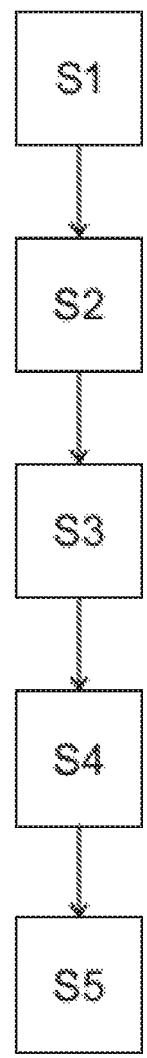
FIG. 2 shows a flow chart of one embodiment of a method according to the present disclosure.
Figure 3:
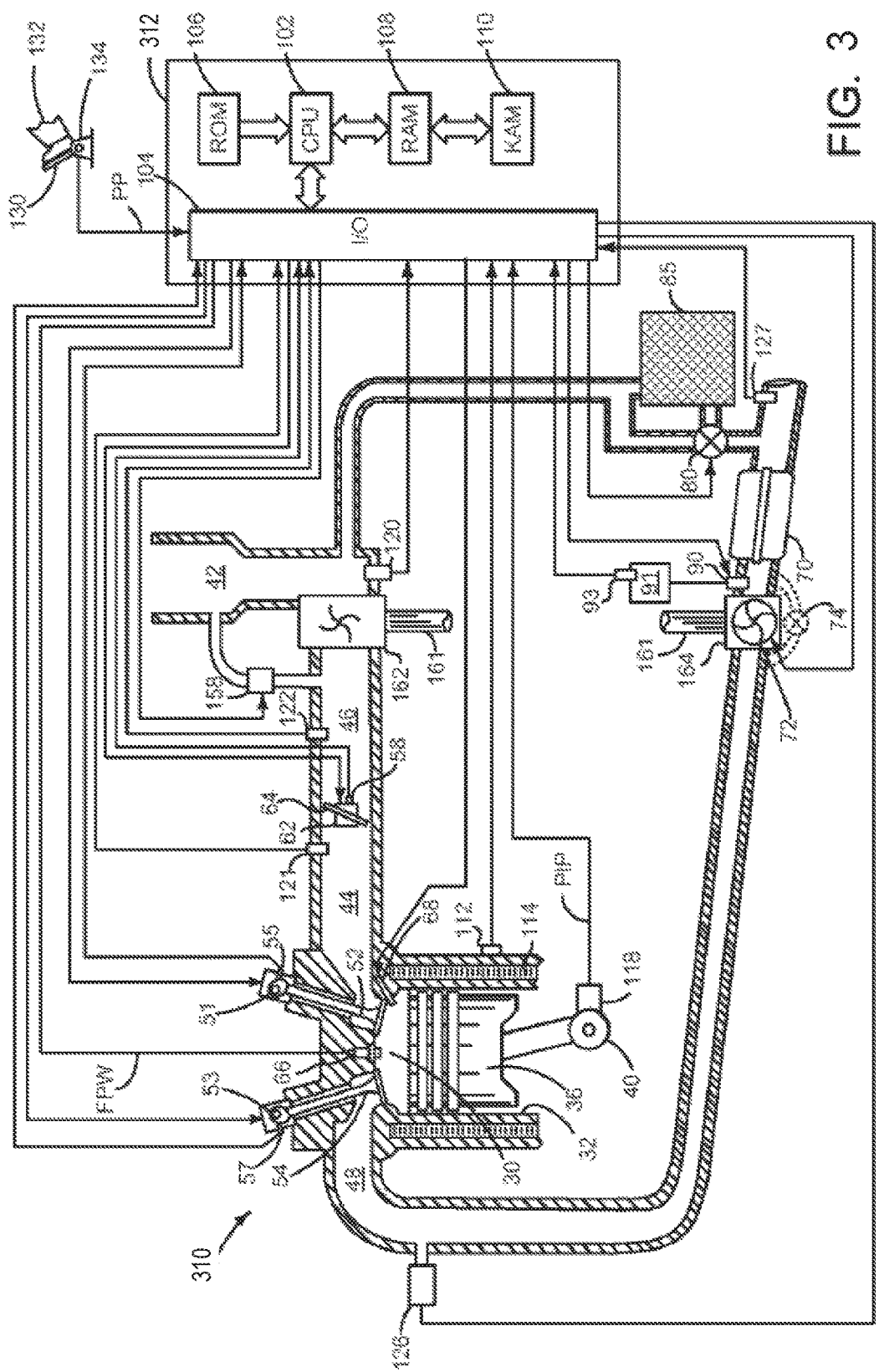
FIG. 3 shows an engine schematic depicting a low-pressure (LP)-EGR passage downstream of a catalyst.
Figure 4:
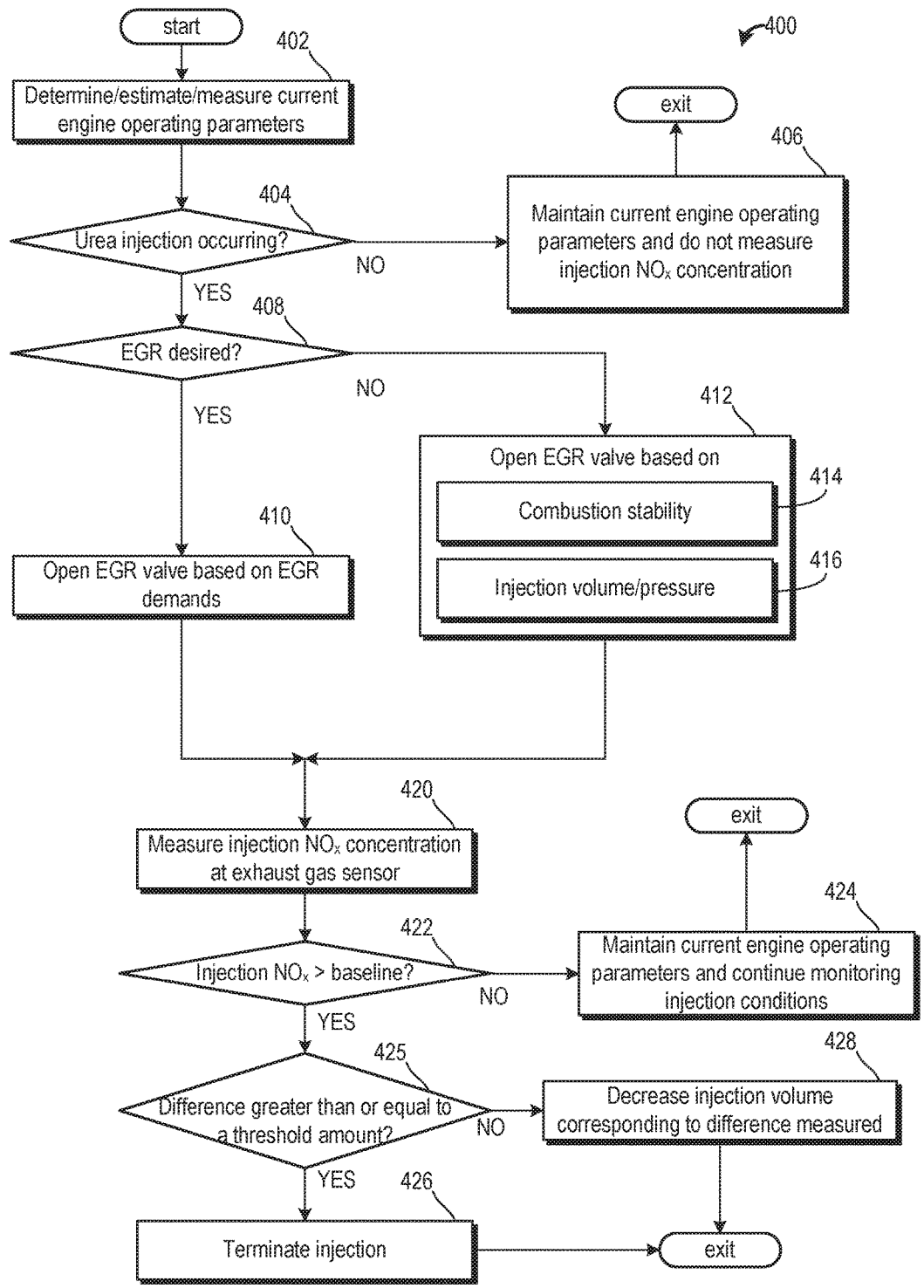
FIG. 4 shows a method for monitoring a urea injection for introducing ammonia to the catalyst.

The following description relates to systems and methods for monitoring urea injection conditions. For example, an injector is positioned to inject urea into an exhaust passage, upstream of a catalyst. Furthermore, a sensor is located downstream of an exhaust manifold and upstream of the injector. An engine schematic illustrating the sensor, the injector, the catalyst, and an EGR passage downstream of the catalyst is shown in FIGS. 1 and 3. A method for operating the sensor an EGR valve in the EGR passage for monitoring ammonia slip through the catalyst is shown in FIGS. 2 and 4. An operating sequence illustrating control of EGR flow and monitoring of ammonia slip through the catalyst is shown in FIG. 5.

FIGS. 1 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

It has become apparent that, in systems with an exhaust gas recirculation system (EGR), there is a relationship between the quantity of nitrogen oxides contained in the exhaust gas escaping from an internal combustion engine and an ammonia slip out of a nitrogen oxide reduction catalytic converter and/or LNT. It has been shown that, in systems with an exhaust gas recirculation system, an increase in the quantity of nitrogen oxide in the exhaust gas escaping directly from the internal combustion engine coincides with the start of ammonia slip. A detection of an ammonia slip out of the catalytic converter and a determination of the quantity of ammonia which has escaped from the catalytic converter as a result of slip can be ascertained according to methods and systems described below.

The method advantageously enables rapid detection of an ammonia slip from a catalytic converter in the vehicle, compared with a detection by a laser device in test bed operation which is typically arranged behind (e.g., downstream of) the catalytic converter. Moreover, a cross sensitivity, which nitrogen oxide sensors often have to ammonia, can be ignored in the method because the ammonia is oxidized in the internal combustion engine to form nitrogen oxides. Moreover, the method can be carried out either continuously or periodically, wherein the periods correspond to reductant injecting conditions.

A reservoir is present for the reducing agent, from which reservoir a reducing agent is introduced into the exhaust tract upstream of the exhaust gas after-treatment device. An aqueous urea solution which is converted into ammonia in the exhaust tract is introduced as the reducing agent. If an ammonia slip is detected as a result of an increased concentration of nitrogen oxides in the exhaust tract upstream of the exhaust gas after-treatment device, a further ammonia slip can be avoided in a timely manner by a reduction in the quantity of introduced reducing agent, e.g., an aqueous urea solution, or a stopping of the introduction of reducing agent.

A catalytic converter for selective catalytic reduction (SCR) is used in the method according to the present disclosure as the exhaust gas after-treatment device. In the catalytic converter for SCR, nitrogen oxides are selectively reduced, wherein ammonia is mixed in with the exhaust gas as the reducing agent (see above).

It is further preferred if, in the method according to the present disclosure, a further exhaust gas after-treatment device contains a nitrogen oxide storage catalytic converter. Detection can be performed with the method even in the case of ammonia which has escaped from a nitrogen oxide storage catalytic converter. The exhaust gas after-treatment device with the nitrogen oxide storage catalytic converter is arranged in the exhaust tract upstream of the exhaust gas after-treatment device with the catalytic converter for selective catalytic reduction (SCR).

The exhaust gas recirculation system is preferably a low-pressure exhaust gas recirculation system (LP-EGR). A LP-EGR may provide nitrogen oxide-reduced exhaust gas is recirculated which—in the event of an ammonia slip—contains ammonia which is oxidized in the internal combustion engine and leads to an increased nitrogen oxide value in the exhaust tract. That is to say, a high-pressure EGR system provides exhaust gas comprising higher levels of $NO_x$ than the LP-EGR passage located downstream of the SCR.

In one example of a method, a model-based CNOX_0 value is used, wherein the CNOX_0 is substantially equal to a concentration of $NO_x$ measured in an exhaust flow during operating conditions not including a reductant injection. This means that a model is created in advance in which a value to be expected of a quantity of nitrogen oxide in the exhaust tract downstream of the internal combustion engine is provided. Alternatively, the CNOX_0 value can be determined empirically by virtue of the fact that the CNOX_0 value in the exhaust tract is tracked over a longer point in time, particularly without introduction of urea into the exhaust tract, or provided as a measurement value which is determined directly before introduction of urea into the exhaust tract.

A second aspect of the present disclosure relates to an arrangement for carrying out a method comprising an internal combustion engine, an exhaust tract, at least one exhaust gas after-treatment device, at least one nitrogen oxide sensor arranged upstream of the exhaust gas after-treatment device, a device arranged between the nitrogen oxide sensor and the exhaust gas after-treatment device for introduction of a reducing agent out of a reducing agent container into the exhaust tract, an exhaust gas recirculation system which branches off downstream of the exhaust gas after-treatment device, a closed-loop control device and an open-loop control device, wherein the closed-loop control device is formed to receive values from the nitrogen oxide sensor and, on the basis of equation (I), see below, determine an ammonia slip, and wherein the open-loop control device is formed to receive values from the closed-loop control device and, in accordance with a determined quantity of ammonia slip, regulate a quantity of supplied reducing agent. The advantages of the arrangement correspond to the advantages of the method according to the present disclosure.

The exhaust gas after-treatment device may be a catalytic converter for selective catalytic reduction, in one embodiment. This can also be fitted on a particle filter. A further exhaust gas after-treatment device may comprise a nitrogen oxide storage catalytic converter.

A third aspect of the present disclosure relates to a motor vehicle with an arrangement according to the present disclosure.

An arrangement 1 according to the present disclosure has, in the embodiment according to FIG. 1, an internal combustion engine 2. Internal combustion engine 2 can be a self-igniting or external ignition internal combustion engine. Internal combustion engine 2 has three cylinders 3, but can have a different number, e.g. two, four, five, six, eight, ten, or twelve cylinders. Internal combustion engine 2 is connected to an exhaust tract 4 and/or exhaust passage 4.

A turbine 5 of a turbocharger is arranged in exhaust tract 4. Turbine 5 is connected via a shaft 6 to a compressor 7 of the turbocharger which is arranged in exhaust tract 8 and/or intake passage 8.

A first exhaust gas after-treatment device 9, which preferably comprises a nitrogen oxide storage catalytic converter 9a, is arranged in exhaust tract 4 downstream of turbine 5. First exhaust gas after-treatment device 9 can furthermore have an oxidation catalytic converter, a three-way catalytic converter, and/or a particle filter.

A second exhaust gas after-treatment device 10, which preferably comprises a catalytic converter for selective catalytic reduction (SCR) and particularly preferably a nitrogen oxide reduction catalytic converter 10a, is arranged downstream of first exhaust gas after-treatment device 9. A particle filter can furthermore be contained in second exhaust gas after-treatment device 10. The particle filter can also be coated with the (SCR) nitrogen oxide reduction catalytic converter 10a. Upstream of the second exhaust gas after-treatment device 10 there is arranged a supply line from a reducing agent container 11 by means of a device for introduction of reducing agent 11a, particularly an aqueous urea solution, can be introduced into exhaust gas tract 4. Device 11a is formed to introduce the reducing agent e.g. by injection or spraying into exhaust tract 4.

Downstream of second exhaust gas after-treatment device 10, low-pressure exhaust gas recirculation system 12 (ND-AGR and/or LP-EGR) branches off from exhaust tract 4. ND-AGR 12 discharges upstream of compressor 7 into exhaust tract 8. There is arranged in ND-AGR 12 an exhaust gas recirculation valve 13 via which an exhaust gas flow out of exhaust tract 4 into ND-AGR 12 can be controlled. Alternatively, exhaust gas recirculation valve 13 or a throttle can be arranged in exhaust tract 4 downstream after the branching of low-pressure exhaust gas recirculation system 12 to increase the counterpressure and as a result be able to supply more exhaust gas to low-pressure exhaust gas recirculation system 12. The combination of exhaust gas recirculation valve 13 with fresh air supply as what is known as a combi valve is furthermore conceivable.

A nitrogen oxide sensor 14 is arranged in exhaust tract 4 directly downstream of internal combustion engine 2 and upstream of the turbine 5. Further nitrogen oxide sensors can be arranged in exhaust tract 4 downstream of internal combustion engine 2. The sensor(s) is/are connected to a closed-loop control device 15 which records values from nitrogen oxide sensor 14 in order to determine whether ammonia is contained in the exhaust gas recirculated in the ND-AGR and in what quantity. Closed-loop control device 15 is connected to an open-loop control device 16 which can receive values from closed-loop control device 15 and in the event of a detected ammonia slip can reduce or stop the introduction of an aqueous urea solution out of reducing agent container 11 into exhaust tract 4. In this way, a reductant injection may be deactivated in response to determining an ammonia slip via the sensor 14.

Further exhaust gas after-treatment components are conceivable, also downstream after the branching of the exhaust gas recirculation system.

In one embodiment of the method according to the representation of FIG. 2, a nitrogen oxide quantity CNOx_A in the exhaust gas escaping directly from internal combustion engine 2 is determined, wherein an ammonia slip can be concluded from nitrogen oxide quantity CNOx_A. Said another way, $CNO_x\_A$ represents ammonia slip. According to FIG. 2, in step S1, an aqueous urea solution can be introduced out of reducing agent container 11 into exhaust gas tract 4 by means of device 11a. Introduction is performed by injection by means of a metering pump or an injector. In step S2, exhaust gas is recirculated behind second exhaust gas after-treatment device 10 via exhaust gas recirculation valve 13 into ND-AGR 12.

In a third step S3, a nitrogen oxide concentration in exhaust tract 4 is determined by means of nitrogen oxide sensor 14 arranged upstream of first exhaust gas after-treatment device 9 and directly downstream of internal combustion engine 2. Nitrogen oxide sensor 14 transfers the measured nitrogen oxide values to closed-loop control device 15 which, in a fourth step S4, calculates an ammonia slip and where applicable the quantity of exhaust gas which has escaped from second exhaust gas after-treatment device 10 from the values on the basis of the equation (I) CNH3=(CNOx_A−CNOx_0)/rEGR. If CNH3 is equal to zero, it is concluded from this that no ammonia has escaped from second exhaust gas after-treatment device 10 as a result of slip. If CNH3 is greater than zero, it is concluded from this that ammonia has escaped from second exhaust gas after-treatment device 10. The quantity of ammonia which has escaped from second exhaust gas after-treatment device 10 can be concluded from the level of the value of CNH3. The obtained value is transmitted to open-loop control device 16. If the quantity of escaped ammonia is moderate, control device 16 thereupon transmits a control command to the device for introduction of a reducing agent 11a, which, in a fifth step S5, reduces the quantity of aqueous urea solution introduced into exhaust tract 4 until no ammonia can be detected any more. If the values are significantly increased, the introduction of the aqueous urea solution in step S5 can alternatively also be completely stopped.

Said another way, the method determines a baseline $NO_x$ concentration via the sensor 14 and sets this value as a threshold. Additionally or alternatively, the baseline $NO_x$ concentration may be determined based on a model for estimating engine $NO_x$ output during operating conditions excluding urea injections, the model accounting for EGR flow, engine speed, engine temperature, and air/fuel ratio. As such, the threshold may be adjusted based on values from a look-up table corresponding to changing engine operating parameters. This may be used when monitoring an exhaust $NO_x$ concentration during changing engine operating parameters to determine ammonia slip more accurately. Thus, the sensor 14 also measure the exhaust $NO_x$ concentration, which is a result of flowing exhaust gas from the exhaust tract 4 to the exhaust tract 8 during an injection (e.g., injector 11A flowing spraying urea into exhaust tract 4). If the exhaust $NO_x$ concentration is substantially equal to the threshold (e.g., baseline $NO_x$ concentration), then ammonia is not leaking through the exhaust after-treatment device 10 and the injection may continue. If the exhaust $NO_x$ concentration is greater than the threshold, then ammonia is slipping through the exhaust after-treatment device 10 and the injection may be terminated or an injection volume may be reduced. In one example, the injection volume is reduced if the exhaust $NO_x$ concentration is less than 5% greater than the threshold. Thus, the injection is terminated if the exhaust $NO_x$ concentration is greater than or equal to 5% greater than the threshold.

Thus, a method for controlling an exhaust gas after-treatment system in a motor vehicle with an internal combustion engine, an exhaust tract, at least one exhaust gas after-treatment device, at least one nitrogen oxide sensor arranged upstream of the exhaust gas after-treatment device, a device arranged upstream of the exhaust gas after-treatment device for introduction of a reducing agent out of a reducing agent container, and an exhaust gas recirculation system which branches off downstream of the exhaust gas after-treatment device, further comprising introducing a reducing agent into the exhaust tract, conducting exhaust gas through the exhaust gas recirculation system by opening an exhaust gas recirculation valve, measuring a nitrogen oxide concentration in the exhaust tract upstream of the exhaust gas after-treatment device by means of a nitrogen oxide sensor arranged there, detecting an ammonia slip out of the exhaust gas after-treatment device, wherein the quantity of escaped ammonia is determined with the equation:

$$CNH3=(CNOx\_A-CNOx\_0)/rEGR$$

where CNH3 is the quantity of escaped ammonia, CNOX_A is the quantity of measured nitrogen oxides on the condition that a reducing agent has been introduced into the exhaust tract, CNOX_0 is the quantity of measured nitrogen oxides on the condition that no reducing agent has been introduced in the exhaust tract, and rEGR is the rate of exhaust gas recirculation; and reducing the quantity of the introduced reducing agent if CNH3 is greater than zero.

The method further includes where the exhaust gas after-treatment device comprises a catalytic converter for selective catalytic reduction. Additionally or alternatively, a second exhaust gas after-treatment device comprises a nitrogen oxide storage catalytic converter. Additionally or alternatively, the exhaust gas recirculation system is a low-pressure exhaust gas recirculation system. A model-based CNOx_0 value based on feedback from the nitrogen oxide sensor may be used. Additionally or alternatively, the engine further comprises a closed-loop control device and an open-loop control device, wherein the closed-loop control device is formed to receive values from the nitrogen oxide sensor and, on the basis of equation, determine an ammonia slip, and wherein the open-loop control device is formed to receive values from the closed-loop control device and, in accordance with a determined quantity of ammonia slip, regulate a quantity of reducing agent introduced into the exhaust tract. Additionally or alternatively, the exhaust gas after-treatment device comprises a catalytic converter for selective catalytic reduction.

Referring to FIG. 3, internal combustion engine 310, comprising a plurality of cylinders, one cylinder of which is shown in FIG. 3, is controlled by electronic engine controller 312. In one example, the controller 312 is substantially similar to one or more of the closed-loop control device 15 and open-loop control device 16 of FIG. 1. Engine 310 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 312. Fuel is delivered to fuel injector 66 by a fuel system including a fuel tank (not shown), fuel pump (not shown), fuel pump control valve (not shown), and fuel rail (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 (e.g., compressor 7 of FIG. 1) draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 (e.g., turbine 5 of FIG. 1) supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel automatically ignites as piston 36 approaches top-dead-center compression stroke. In some examples, a universal Exhaust Gas Oxygen (UEGO) sensor 126, which may be used similarly to nitrogen oxide sensor 14 of FIG. 1, may be coupled to exhaust manifold 48 upstream of emissions device 70. Further, in some examples, the UEGO sensor may be a NOx sensor that has both NOx and oxygen sensing elements. NOx sensor 127 samples tailpipe NOx downstream of SCR 70. In some examples, NOx sensor 127 may be omitted.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression. Additionally or alternatively, glow plug 68 may be a spark plug configured to ignite a combustion mixture of a spark ignited engine.

Emissions device 70 can include SCR catalyst bricks, in one example. In another example, multiple emission control devices, each with multiple bricks, can be used. Emissions device 70 can include an oxidation catalyst in one example. In other examples, the emissions device may include a lean NOx trap followed by a selective catalyst reduction (SCR), and/or a diesel particulate filter (DPF). Urea may be injected upstream of SCR catalyst 70 via urea injector 90. Urea injector 90 receives urea from urea tank 91. Level sensor 93 senses the amount of urea stored in urea tank 91.

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other examples, high pressure and low pressure EGR system may be provided. Herein, the exhaust gas recirculation (EGR) provided by EGR valve 80 is low-pressure exhaust gas recirculation (LP-EGR).

Controller 312 is shown in FIG. 1 as a conventional microcomputer including: microprocessor unit 102, input/output ports 104, read-only memory 106, random access memory 108, keep alive memory 110, and a conventional data bus. Controller 312 is shown receiving various signals from sensors coupled to engine 310, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122; exhaust gas $NO_x$ concentration from $NO_x$ sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 312. In a preferred aspect of the present description, engine position sensor 118 produces a predetermined number of equally spaced pulses every revolution of the crankshaft from which engine speed (RPM) can be determined.

The controller 112 receives signals from the various sensors of FIG. 1 and employs the various actuators of FIG. 1 to adjust engine operation based on the received signals and instructions stored on a memory of the controller. For example, adjusting a urea injection may include adjusting an actuator of the urea reservoir 91 in response to feedback from the sensor 126.

During operation, each cylinder within engine 310 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back toward BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC.

Thus, a system comprises a low-pressure exhaust gas recirculation (LP-EGR) passage fluidly coupled to an exhaust passage downstream of a catalyst and to an intake passage upstream of a compressor at opposite ends, a nitrogen oxide sensor located in the exhaust passage downstream of an engine and upstream of an injector, where the injector is positioned to inject reductant into the exhaust passage upstream of the catalyst; and a controller with computer-readable instructions stored thereon for determining a baseline $NO_x$ concentration, flowing LP-EGR in response to the injector injecting reductant into the exhaust passage independent of an EGR demand, measuring an exhaust $NO_x$ concentration via the nitrogen oxide sensor following combustion of the LP-EGR, comparing the exhaust $NO_x$ concentration to the baseline $NO_x$ concentration, and decreasing the injection volume in response to the exhaust $NO_x$ concentration being greater than the baseline $NO_x$ concentration, wherein the decreasing further includes decreasing the injection volume to zero in response to the exhaust $NO_x$ concentration being greater than the baseline $NO_x$ concentration by a threshold amount.

FIG. 4 shows a method 400 for monitoring ammonia slip through an SCR device during a urea injection. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402, where the method 400 determines, estimates, and/or measures current engine operating parameters. Current engine operating parameters may include but are not limited to one or more of engine load, engine temperature, ambient temperature, exhaust mass flow rate, SCR temperature, engine $NO_x$ output, vehicle speed, engine speed, and air/fuel ratio. In one example, the engine $NO_x$ output is equal to a baseline $NO_x$ concentration as will be described below.

At 404, the method 400 determines if a urea injection is occurring. The urea injection may be delivered by an injector positioned to inject into an exhaust passage upstream of an SCR device. For example, the injector 11A of FIG. 1 or the injector 90 of FIG. 3 inject atomized urea into an exhaust gas flow upstream of SCR device 10 or SCR device 70, respectively. If the urea injection is not occurring, then the method 400 proceeds to 406 to maintain current engine operating parameters and does not measure an exhaust $NO_x$ concentration.

If the injection is occurring, then the method 400 proceeds to 408 to determine if EGR is desired. In one example, EGR is desired when emissions exceed a threshold standard and/or when engine and/or combustion temperatures are greater than a threshold temperature, where the threshold temperature may be based on emissions output and/or system degradation. In some examples, EGR may continuously flow to an engine at varying amounts, where the amount is adjusted based on one or more of combustion stability, engine temperature, combustion temperature, air/fuel ratio, throttle position, and vehicle speed. As an example, engine operating parameters may be adjusted to allow a greater amount of EGR to flow to the engine, thereby reducing an emissions output. For example, spark timing may be advanced in response to an increased amount of EGR flowing to the engine. If EGR is desired, then the method 400 proceeds to 410 to open an EGR valve. The EGR valve is moved to a more open position or a fully open position according to the EGR demands. In one example, the more open position is located between a fully open and fully closed position. The fully open position flows a maximum amount (e.g., 100%) of EGR to the engine and the fully closed position flows no (e.g., 0%) EGR to the engine. As such, the more open position may be adjusted to flow between 0 to 100% EGR to the engine.

If EGR is not desired, then the method 400 proceeds to 412 to open the EGR valve based on combustion stability 414 and injection volume and/or pressure 416. Additionally or alternatively, the opening of the EGR valve may be based on engine temperature, vehicle speed, throttle position, and/or air/fuel ratio. In this way, the EGR valve moves to a more open position closer to the closed position than the fully open position when the injection is occurring and EGR is not desired. In one example, the EGR valve moves to a more open position where the EGR flow is a minimum allowable EGR flow for allowing the method 400 to monitor ammonia slip through the SCR without altering combustion conditions. The minimum allowable EGR flow may be based on a lowest amount of EGR flowing to the engine capable of increasing a $NO_x$ output without altering combustion conditions. The lowest allowable amount may further be adjusted based on the injection volume and/or pressure, wherein the lowest allowable amount decreases (e.g., flow less EGR) when the injection volume and/or pressure increases.

At any rate, the method 400 proceeds to 420, following 410 or 412, and includes measuring the exhaust $NO_x$ concentration at the exhaust gas sensor between the engine and the injector. As such, ammonia, if any, in the EGR flow is oxidized during the combustion process into $NO_x$ and may be monitored by the exhaust gas sensor. In one example, exhaust gas sensor 14 or exhaust gas sensor 126 of FIGS. 1 and 3, respectively, measure the exhaust $NO_x$ concentration.

At 422, the method 400 includes determining if the exhaust $NO_x$ concentration is greater than the baseline $NO_x$ concentration. The baseline $NO_x$ concentration may be based on a value in a look-up table, wherein the value is determined based on current engine operating parameters including one or more of EGR flow rate, engine speed, vehicle speed, and air/fuel ratio. Engine $NO_x$ output may be continuously measured by a nitrogen oxide sensor and feedback from the sensor is stored with corresponding engine operating parameters. In this way, the baseline $NO_x$ concentration is based on a $NO_x$ concentration in the exhaust gas flow when the injector is not injecting reductant into the exhaust passage. Additionally or alternatively, the baseline $NO_x$ concentration may be substantially equal to a measurement by the nitrogen oxide sensor prior to the injection (e.g., a measurement at 402).

By comparing the exhaust $NO_x$ concentration to the baseline $NO_x$ concentration, ammonia may be determined to be slipping through the SCR device and into the EGR passage. If the exhaust $NO_x$ concentration is substantially equal to the baseline $NO_x$ concentration, then the method proceeds to 424 and maintains current engine operating parameters and does not terminate the urea injection. Furthermore, the method continues to monitor EGR flow to determine if ammonia slip is occurring. It will be appreciated that the exhaust $NO_x$ concentration is not less than the baseline $NO_x$ concentration (e.g., the engine only $NO_x$ concentration), since the baseline $NO_x$ concentration is a lowest $NO_x$ output for current engine operating parameters.

If the exhaust $NO_x$ concentration is greater than the baseline $NO_x$ concentration, then the method 400 proceeds to 425 to determine if a difference between the exhaust NOx concentration and the baseline is greater than or equal to a threshold amount. In one example, the threshold amount is equal to 10%. It will be appreciated that the threshold amount may be equal to other percentages less than or greater than 10%.

If the exhaust $NO_x$ concentration is greater than the baseline $NO_x$ concentration by a threshold amount (e.g., 10%), then the method 400 proceeds to 426 to terminate the injection. In this way, the SCR is fully loaded with ammonia and ammonia begins to slip therethrough. By doing this, urea efficiency may be increased as an amount of excess urea being injected into the exhaust passage is decreased.

If the exhaust $NO_x$ concentration is greater than the baseline $NO_x$ concentration by an amount less than the threshold amount, then the method 400 proceeds to 428 to decrease an amount of urea injected based on a difference between the exhaust $NO_x$ concentration and the baseline $NO_x$ concentration. For example, the reduction in response to the exhaust $NO_x$ concentration being 7% greater than the baseline $NO_x$ concentration is greater than the reduction in response to a 3% difference. Said another way, more urea continues to be injected following the 3% difference compared to the 7% difference. In this way, the catalyst may be approaching a fully loaded state and desire a lower concentration of reductant in the exhaust gas flowing toward the catalyst.

In this way, a method for monitoring injection conditions includes measuring an exhaust $NO_x$ concentration during an injection via a sensor located between an exhaust side of an engine and an injector, comparing the exhaust $NO_x$ concentration to a baseline value, and determining if ammonia is slipping through a catalyst in response to the exhaust $NO_x$ concentration being greater than the baseline value by a threshold amount. The baseline value is measured via the sensor prior to the injection, in one example. Additionally or alternatively, the baseline value is based on values in a look-up table corresponding to current engine operating parameters. The injection is terminated in response to the exhaust $NO_x$ concentration being greater than the baseline value by an amount greater than or equal to the threshold amount. The injection is adjusted to inject less reductant in response to the exhaust $NO_x$ concentration being greater than the baseline value by an amount less than the threshold amount. The injection is adjusted based on a difference between the exhaust $NO_x$ concentration and the baseline value, wherein an injection amount is increasingly decreased as the difference increases.

The catalyst is one or more of a selective catalytic reduction device and a lean $NO_x$ trap. Additionally or alternatively, the catalyst further comprises a particulate filter. The method optionally includes flowing low-pressure exhaust gas recirculate (LP-EGR) through a passage coupled to an exhaust passage downstream of the catalyst and to an intake passage upstream of a compressor. The LP-EGR flows to the intake passage when an EGR valve is in a more open position, further comprising actuating the EGR valve to at least the more open position in response to one or more of an engine EGR demand and the injection. Actuating the EGR valve during an injection absent the engine EGR demand include actuating the EGR valve to a less open position compared to a position of the EGR valve during an injection including an engine EGR demand. Flowing LP-EGR during the injection further includes oxidizing ammonia in the exhaust gas during combustion.

Turning now to FIG. 5, it shows an operating sequence 500 illustrating example results for an exhaust system configured to flow EGR during a urea injection. In one example, the operating sequence 500 illustrates example results for SCR 10 and sensor 14 of FIG. 1 and/or sensor 126 and SCR 70 of FIG. 3 operating under methods described in FIG. 4. Line 502 represents an EGR demand, line 504 represents an EGR flow rate, line 506 represents if an injection is occurring, and line 508 represents the baseline $NO_x$ concentration and/or the engine only $NO_x$ concentration and dashed line 510 represents the exhaust $NO_x$ concentration. Line 502 is only visible when EGR is demanded and line 506 is only visible when an injection is occurring. Line 504 is visible only when EGR is flowing to the engine. Lastly, line 510 is only visible during the injection when ammonia is slipping through the SCR. Otherwise, line 510 is substantially identical to the line 508. The horizontal axes of each plot represent time and time increases from the left side of the figure to the right side of the figure.

Prior to $t_1$, the engine demands EGR, as shown by line 502. As such, the EGR flow rate is between relatively high and low rates, as shown by line 504. As EGR flows to the engine, the baseline $NO_x$ concentration in exhaust gas downstream of the engine and upstream of the SCR decreases, as shown by line 508. Thus, the EGR is decreasing $NO_x$ output. The injector is off and the injection amount is zero, as shown by line 506.

At $t_1$, the injector is activated and the injection amount increases toward a relatively high amount. In one example, the injector is activated in response to the SCR demanding urea, which may be based on a threshold distance traveled and/or a threshold duration passing since a previous injection. As shown, the EGR flow rate remains substantially constant. In some examples, the EGR flow rate may slightly increase during the urea injection. The exhaust $NO_x$ concentration remains substantially constant. As such, the exhaust $NO_x$ concentration may be compared to this value. Additionally or alternatively, as described above, the baseline $NO_x$ concentration (e.g., the engine only $NO_x$ concentration) may be adjusted based on engine operating parameters corresponding to values found in a look-up table to set a baseline for comparing the exhaust $NO_x$ concentration to.

After $t_1$ and prior to $t_2$, the injector is active. The EGR flow remains relatively constant. An exhaust gas sensor continues to monitor $NO_x$ concentration of combustion gases during the injection as shown by lines 508 and 510. The EGR flow remains substantially constant. The exhaust $NO_x$ concentration begins to deviate from the baseline $NO_x$ concentration, but by an amount less than a threshold amount. In the injection amount is shown to remain substantially constant, however, as described above, the injection amount may be decreased based on the amount of the deviation between the exhaust $NO_x$ concentration and the baseline $NO_x$ concentration.

At $t_2$, the exhaust $NO_x$ concentration is greater than the baseline $NO_x$ concentration by at least the threshold amount. As a result, the injection is terminated and the injection amount decreases to zero. The engine continues to demand EGR and the EGR flow rate remains substantially constant.

After $t_2$ and prior to $t_3$, the EGR flow rate continues to meet the engine demand. In one example, the amount is substantially equal to the amount demanded by the engine prior to $t_1$. The exhaust $NO_x$ concentration continues to deviate from the baseline $NO_x$ concentration, despite the injector being turned off, due to an amount of urea remaining in the LP-EGR passage. For example, following deactivation of the injection, an amount of urea remains in the exhaust gas flow, where the excess urea flows to an ambient atmosphere or to the engine. The injector is deactivated and the injection amount is zero.

At $t_3$, the engine no longer demands EGR. As such, the EGR valve is closed and the EGR flow rate is reduced to zero. The injection remains deactivated and the injection amount remains at zero. In one example, the urea in the exhaust gas flow and the exhaust $NO_x$ is substantially equal to the baseline $NO_x$. Due to the decrease in EGR flow, the baseline $NO_x$ begins to increase. In some examples, the baseline NOx concentration may remain substantially constant following stopping EGR flow.

After $t_3$ and prior to $t_4$, the EGR demand is zero and the EGR flow rate remains at zero. The injector is deactivated and the injection amount is zero. The exhaust $NO_x$ and baseline $NO_x$ are substantially equal, and the baseline $NO_x$ continues to increase due to the EGR being off.

At $t_4$, the injector is activated and the injection amount increases to a mid-amount between the relatively high and low amounts. As a result, the EGR flow rate is increased to a relatively low flow rate to intrusively flow EGR due to the EGR demand being zero. As such, the EGR flow rate is based on current engine operating parameters and the injection volume, as described above. In this way, a position of an EGR valve at $t_4$ is closer to the fully closed position than a position of the EGR valve prior to $t_3$. By doing this, the baseline $NO_x$ begins to slightly decrease due to the EGR flow. As an example considering constant engine operating parameters, if the injection volume decreases, then the EGR flow rate may increase to compensate for less urea flowing through the exhaust passage. In other examples, the EGR flow rate may be fixed during injections where EGR is not demanded. For example, the EGR flow rate is less than 5%. In this way, engine operating parameters may not be significantly affected. By doing this, adjustments are not made to compensate for the intrusive EGR flow.

After $t_4$ and prior to $t_5$, the injector remains active and continues to inject urea. The EGR flow remains substantially equal to the relatively low amount and the baseline $NO_x$ continues to slightly decrease. The exhaust $NO_x$ begins to differentiate from the baseline $NO_x$ value. However, the difference is less than the threshold difference and in response, the injection amount decreases by an amount corresponding to the difference between the exhaust $NO_x$ and the baseline $NO_x$. As such, the injection amount is increasingly decreased as the difference between the exhaust $NO_x$ and the baseline $NO_x$ increases. The engine does not demand EGR, however, the EGR continues to intrusively flow towards the engine during the injection.

At $t_5$, the exhaust $NO_x$ differentiates from the baseline $NO_x$ by an amount greater than the threshold difference. As such, the injector is shut-off and the injection amount is reduced to zero. Since the EGR demand is still zero, the EGR valve is actuated to a fully closed position and the EGR flow rate is reduced to zero. As a result, the baseline $NO_x$ begins to increase.

After $t_5$ and prior to $t_6$, the EGR demand is zero, the EGR flow rate is zero, and the injection amount is zero. The exhaust $NO_x$ continues to increase due to excess ammonia still being present in exhaust gas in the EGR passage. The baseline $NO_x$ remains substantially constant.

At $t_6$, the EGR demand is zero, the EGR flow rate is zero, and the injection amount is zero. The ammonia in the EGR passage is consumed and the exhaust $NO_x$ becomes substantially equal to the baseline $NO_x$. The baseline $NO_x$ remains substantially constant.

After $t_6$, the EGR demand is zero, the EGR flow rate is zero, and the injection amount is zero. The baseline and exhaust $NO_x$ concentrations remain substantially constant.

In this way, LP-EGR downstream of an SCR device may be used to monitor ammonia slippage through a catalyst. By comparing a concentration of $NO_x$ during a reductant injection to a baseline concentration of $NO_x$ that would otherwise be formed outside of the injection, ammonia slippage may be identified and stopped. The technical effect of flowing EGR during the injection is to oxidize the ammonia during the combustion process so a sensor between an exhaust side of an engine and the injector may monitor $NO_x$ output. By locating the sensor upstream of the injector, ammonia may not hinder $NO_x$ measurements. This decreases a likelihood of cross sensitivity occurring, which may result in an increased fidelity of $NO_x$ concentration measurements. By doing this, manufacturing costs and packaging constraints may be decreased compared to vehicles arranging additional catalysts in the exhaust passage to capture the slipped ammonia.

A method comprises measuring an exhaust $NO_x$ concentration, during an injection of a reductant from an injector, via a sensor located between an exhaust side of an engine and the injector, comparing the exhaust $NO_x$ concentration to a baseline value; and determining if ammonia is slipping through a catalyst in response to the exhaust $NO_x$ concentration being greater than the baseline value by a threshold amount. A first example of the method further includes where the baseline value is measured via the sensor prior to the injection. A second example of the method, optionally including the first example, further includes where the baseline value is estimated based on EGR flow, engine temperature, engine speed, and air/fuel ratio. A third example of the method, optionally including the first and/or second examples, further includes where the injection is terminated in response to the exhaust $NO_x$ concentration being greater than the baseline value by an amount greater than or equal to the threshold amount. A fourth example of the method, optionally including one or more of the first through third examples, further includes where the injection is adjusted to inject less reductant in response to the exhaust $NO_x$ concentration being greater than the baseline value by an amount less than the threshold amount. A fifth example of the method, optionally including one or more of the first through fourth examples, further includes where the injection is adjusted based on a difference between the exhaust $NO_x$ concentration and the baseline value, wherein an injection amount is increasingly decreased as the difference increases. A sixth example of the method, optionally including one or more of the first through fifth examples, further includes where the catalyst is one or more of a selective catalytic reduction device and a lean $NO_x$ trap. A seventh example of the method, optionally including one or more of the first through sixth examples, further includes where the catalyst further comprises a particulate filter. An eighth example of the method, optionally including one or more of the first through seventh examples, further includes where flowing low-pressure exhaust gas recirculate (LP-EGR) through a passage coupled to an exhaust passage downstream of the catalyst and to an intake passage upstream of a compressor. A ninth example of the method, optionally including one or more of the first through eighth examples, further includes where the LP-EGR flows to the intake passage when an EGR valve is in a more open position, further comprising actuating the EGR valve to at least the more open position in response to one or more of an engine EGR demand and the injection. A tenth example of the method, optionally including one or more of the first through ninth examples, further includes where intrusively flowing LP-EGR during the injection when the engine EGR demand is off. An eleventh example of the method, optionally including one or more of the first through ninth examples, further includes where flowing LP-EGR during the injection further includes oxidizing ammonia in the exhaust gas during combustion.

A method for controlling an exhaust gas after-treatment system in a motor vehicle with an internal combustion engine, an exhaust tract, at least one exhaust gas after-treatment device, at least one nitrogen oxide sensor arranged upstream of the exhaust gas after-treatment device, a device arranged upstream of the exhaust gas after-treatment device for introduction of a reducing agent out of a reducing agent container, and an exhaust gas recirculation system which branches off downstream of the exhaust gas after-treatment device, further comprising introducing a reducing agent into the exhaust tract, conducting exhaust gas through the exhaust gas recirculation system by opening an exhaust gas recirculation valve, measuring a nitrogen oxide concentration in the exhaust tract upstream of the exhaust gas after-treatment device by means of a nitrogen oxide sensor arranged there, detecting an ammonia slip out of the exhaust gas after-treatment device, wherein the quantity of escaped ammonia is determined with the equation CNH3= (CNOx_A−CNOx_0)/rEGR, and where CNH3 is the quantity of escaped ammonia, CNOX_A is the quantity of measured nitrogen oxides on the condition that a reducing agent has been introduced into the exhaust tract, CNOX_0 is the quantity of measured nitrogen oxides on the condition that no reducing agent has been introduced in the exhaust tract, and rEGR is the rate of exhaust gas recirculation, and reducing the quantity of the introduced reducing agent if CNH3 is greater than zero.

A first example the method further includes where the exhaust gas after-treatment device comprises a catalytic converter for selective catalytic reduction. A second example of the method, optionally including the first examples, further includes where a second exhaust gas after-treatment device comprising a nitrogen oxide storage catalytic converter. A third example of the method, optionally including the first and/or second examples further includes where the exhaust gas recirculation system is a low-pressure exhaust gas recirculation system. A fourth example of the method, optionally including one or more of the first through third examples, further includes where a model-based CNOx_0 value based on feedback from the nitrogen oxide sensor. A fifth example of the method, optionally including one or more of the first through fourth examples, further includes where the engine further comprises a closed-loop control device and an open-loop control device, wherein the closed-loop control device is formed to receive values from the nitrogen oxide sensor and, on the basis of equation, determine an ammonia slip, and wherein the open-loop control device is formed to receive values from the closed-loop control device and, in accordance with a determined quantity of ammonia slip, regulate a quantity of reducing agent introduced into the exhaust tract. A sixth example of the method, optionally including one or more of the first through fifth examples, further includes where the exhaust gas after-treatment device comprises a catalytic converter for selective catalytic reduction.

A system comprising a low-pressure exhaust gas recirculation (LP-EGR) passage fluidly coupled to an exhaust passage downstream of a catalyst and to an intake passage upstream of a compressor at opposite ends, a nitrogen oxide sensor located in the exhaust passage downstream of an engine and upstream of an injector, where the injector is positioned to inject reductant into the exhaust passage upstream of the catalyst, and a controller with computer-readable instructions stored thereon for determining a baseline NO$_x$ concentration, flowing LP-EGR in response to the injector injecting reductant into the exhaust passage independent of an EGR demand, measuring a exhaust NO$_x$ concentration via the nitrogen oxide sensor following combustion of the LP-EGR, comparing the exhaust NO$_x$ concentration to the baseline NO$_x$ concentration, and decreasing the injection volume in response to the exhaust NO$_x$ concentration being greater than the baseline NO$_x$ concentration, wherein the decreasing further includes decreasing the injection volume to zero in response to the exhaust NO$_x$ concentration being greater than the baseline NO$_x$ concentration by a threshold amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing may not be used to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    measuring an exhaust NO$_x$ concentration, during an injection of a reductant from an injector, via a sensor located between an exhaust side of an engine and the injector;
    comparing the exhaust NO$_x$ concentration to a baseline value; and
    determining if ammonia is slipping through a catalyst in response to the exhaust NO$_x$ concentration being greater than the baseline value by a threshold amount.

2. The method of claim 1, wherein the baseline value is measured via the sensor prior to the injection.

3. The method of claim 1, wherein the baseline value is estimated based on EGR flow, engine temperature, engine speed, and air/fuel ratio.

4. The method of claim 1, wherein the injection is terminated in response to the exhaust NO$_x$ concentration being greater than the baseline value by an amount greater than or equal to the threshold amount.

5. The method of claim 1, wherein the injection is adjusted to inject less reductant in response to the exhaust NO$_x$ concentration being greater than the baseline value by an amount less than the threshold amount.

6. The method of claim 5, wherein the injection is adjusted based on a difference between the exhaust NO$_x$ concentration and the baseline value, wherein an injection amount is increasingly decreased as the difference increases.

7. The method of claim 1, wherein the catalyst is one or more of a selective catalytic reduction device and a lean NO$_x$ trap.

8. The method of claim 7, wherein the catalyst further comprises a particulate filter.

9. The method of claim 1, further comprising flowing low-pressure exhaust gas recirculate (LP-EGR) through a passage coupled to an exhaust passage downstream of the catalyst and to an intake passage upstream of a compressor.

10. The method of claim 9, wherein the LP-EGR flows to the intake passage when an EGR valve is in a more open position, further comprising actuating the EGR valve to at least the more open position in response to one or more of an engine EGR demand and the injection.

11. The method of claim 10, further comprising intrusively flowing the LP-EGR during the injection when the engine EGR demand is off.

12. The method of claim 9, wherein flowing the LP-EGR during the injection further includes oxidizing ammonia in exhaust gas during combustion.

13. A method for controlling an exhaust gas after-treatment system in a motor vehicle with an internal combustion engine, an exhaust tract, at least one exhaust gas after-treatment device, at least one nitrogen oxide sensor arranged upstream of the exhaust gas after-treatment device, a device arranged upstream of the exhaust gas after-treatment device for introduction of a reducing agent out of a reducing agent container, and an exhaust gas recirculation system which branches off downstream of the exhaust gas after-treatment device, further comprising:
    introducing the reducing agent into the exhaust tract,
    conducting exhaust gas through the exhaust gas recirculation system by opening an exhaust gas recirculation valve,
    measuring a nitrogen oxide concentration in the exhaust tract upstream of the exhaust gas after-treatment device by means of the nitrogen oxide sensor arranged there,
    detecting an ammonia slip out of the exhaust gas after-treatment device,
    wherein a quantity of escaped ammonia is determined with the equation:

$$CNH3 = (CNOx\_A - CNOx\_0)/rEGR,$$

and where CNH3 is the quantity of escaped ammonia, CNOX_A is a quantity of measured nitrogen oxides on a condition that the reducing agent has been introduced into the exhaust tract, CNOX_0 is the quantity of measured nitrogen oxides on a condition that no reducing agent has been introduced in the exhaust tract, and rEGR is a rate of exhaust gas recirculation; and reducing a quantity of the introduced reducing agent if CNH3 is greater than zero.

14. The method of claim 13, wherein the exhaust gas after-treatment device comprises a catalytic converter for selective catalytic reduction.

15. The method of claim 14, further comprising a second exhaust gas after-treatment device comprising a nitrogen oxide storage catalytic converter.

16. The method of claim 13, wherein the exhaust gas recirculation system is a low-pressure exhaust gas recirculation system.

17. The method of claim 13, further comprising a model-based CNOx_0 value based on feedback from the nitrogen oxide sensor.

18. The method of claim 13, wherein the engine further comprises a closed-loop control device and an open-loop control device, wherein the closed-loop control device is formed to receive values from the nitrogen oxide sensor and, on the basis of equation, determine an ammonia slip, and wherein the open-loop control device is formed to receive values from the closed-loop control device and, in accordance with a determined quantity of ammonia slip, regulate a quantity of reducing agent introduced into the exhaust tract.

19. The method of claim 18, wherein the exhaust gas after-treatment device comprises a catalytic converter for selective catalytic reduction.

20. A system comprising:

a low-pressure exhaust gas recirculation (LP-EGR) passage fluidly coupled to an exhaust passage downstream of a catalyst and to an intake passage upstream of a compressor at opposite ends;

a nitrogen oxide sensor located in the exhaust passage downstream of an engine and upstream of an injector, where the injector is positioned to inject reductant into the exhaust passage upstream of the catalyst; and a controller with computer-readable instructions stored thereon for:

determining a baseline $NO_x$ concentration, flowing the LP-EGR passage in response to the injector injecting reductant into the exhaust passage independent of an EGR demand, measuring an exhaust $NO_x$ concentration via the nitrogen oxide sensor following combustion of the LP-EGR passage, comparing the exhaust $NO_x$ concentration to the baseline $NO_x$ concentration, and decreasing an injection volume in response to the exhaust $NO_x$ concentration being greater than the baseline $NO_x$ concentration, wherein the decreasing further includes decreasing the injection volume to zero in response to the exhaust $NO_x$ concentration being greater than the baseline $NO_x$ concentration by a threshold amount.

* * * * *